Patented Jan. 26, 1954

2,667,475

UNITED STATES PATENT OFFICE 2,667,475

BLEACHING KERATINOUS MATERIALS

Harold F. Fick, Beloit, Wis., assignor to Rochester Button Company, Rochester, N. Y., a corporation of New York No Drawing. Application February 23, 1951
Serial No. 212,513

6 Claims. (Cl. 260—123.7)

This invention relates to the bleaching of keratinous materials such as comminuted hoof and horn.

Hydrogen peroxide has been proposed as a bleaching agent for keratinous materials but the bleaching of hoof and horn with hydrogen peroxide has not been wholly satisfactory. Even with the use of uneconomically large amounts of the bleaching agents it has been difficult to convert the darker portions of the hoof or horn material to useful light shades.

It has now been found that greatly improved results can be obtained with substantially reduced amounts of the bleaching agents by destroying or inactivating a hydrogen peroxide decomposing enzyme or catalase in the hoof or horn material before it is treated with hydrogen peroxide. It has further been found that effective inactivation of the catalase content of hoof or horn can only be obtained when the material is finely divided. A particularly advantageous method of inactivating the catalase is to heat the finely ground hoof or horn material, conveniently in suspension in water, to 120° F. or above. After such treatment the material can readily be bleached to a lighter color with substantially smaller amounts of hydrogen peroxide than without such treatment.

The principles of the invention are illustrated by the following example of the bleaching of horn material:

Hoof material is comminuted in a roller mill, burr mill or hammer mill into flakes small enough to pass a 40 mesh screen. The comminuted material is mixed with sufficient water to give a stirrable slurry and the slurry is heated to 180° F., allowed to settle and washed by decantation or filtration.

The washed inactivated hoof material is then treated with hydrogen peroxide. For example, 750 pounds of relatively dark hoof material is mixed with sufficient water to give a stirrable slurry and 70 pounds of 35% hydrogen peroxide are stirred in at 180° F. together with enough sodium silicate (normally 25 to 50 pounds) to give a pH between 7.5 and 9. After 2 to 4 hours the liquid is drained from the hoof material and the material is washed with water. It is then re-slurried with water and treated with 10 pounds of sodium hydrosulfite for 2 hours at 120° F. to destroy residual hydrogen peroxide and decolorize color components which are acted on more readily by the hydrosulfite than by hydrogen peroxide.

When treating hoof material of lighter color the amount of peroxide may be proportionately reduced, to as low as 15 pounds, the lightest grade of raw hoof and the temperature of the peroxide may be reduced to as low as 120° F. while the amount of hydrosulfite in the aftertreatment may be reduced to five pounds for the same weight of horn material.

By this treatment light colored hoof can be bleached to a much lighter color than could otherwise be attained even with the use of an excessive amount of hydrogen peroxide and a treatment of several days; while black and dark brown hoof can be bleached to a translucent light color, which could not be attained by any previously known bleaching process.

The liquor drawn off from the bleaching operation frequently contains up to 50% or more of the original hydrogen peroxide which may be reused in a subsequent bleaching operation thus further conserving peroxide and reducing the cost of the bleaching operation.

The bleaching operations are preferably carried out in glass-lined or stainless steel equipment to avoid contamination with iron.

Instead of inactivating the catalase content of the keratinous material by heat as described in the specific example, other inactivation treatments may be utilized, such as treatment of the material with enzyme poisons, for example, mercuric chloride.

I claim:

1. A method of bleaching keratinous materials which comprises inactivating the catalase content of the keratinous material and thereafter treating the material with an aqueous solution of hydrogen peroxide.

2. A method of bleaching horn and hoof substance which comprises inactivating the catalase content of the substance in finely ground condition and thereafter treating the substance with an aqueous solution of hydrogen peroxide.

3. A method of bleaching horn and hoof substance which comprises heating an aqueous slurry of the substance in finely ground condition to a temperature of at least 120° F. to inactivate the catalase content thereof and thereafter treating the substance with an aqueous solution of hydrogen peroxide.

4. A method of bleaching horn and hoof substance which comprises heating an aqueous slurry of the substance in finely ground condition to a temperature of at least 120° F. to inactivate the catalase content thereof and thereafter treating the substance with an aqueous solution of hydrogen peroxide at a temperature of from about 120° F. to about 180° F.

5. A method of bleaching keratinous materials which comprises inactivating the catalase content of the keratinous material, thereafter treating the material with an aqueous solution of hydrogen peroxide, removing the material from the hydrogen peroxide solution, and treating it with an amount of sodium hydrosulfite at least sufficient to destroy residual hydrogen peroxide.

6. A method of bleaching horn and hoof substance which comprises heating an aqueous slurry of the substance to a temperature of at least 120° F. to inactivate the catalase content thereof, thereafter treating the substance with an aqueous solution of hydrogen peroxide, separating the substance from the hydrogen peroxide solution, and treating it with an amount of sodium hydrosulfite at least sufficient to destroy residual hydrogen peroxide.

HAROLD F. FICK.

References Cited in the file of this patent

UNITED STATES PATENTS

| Number | Name | Date |
| --- | --- | --- |
| 2,454,730 | Bokonyi | Nov. 23, 1948 |

OTHER REFERENCES

Reichert et al., Section of the Technical Ass. of the Pulp and Paper Industry, pp. 37–40, Jan. 31, 1946, N. Y.